US012380814B2

(12) United States Patent
Rössl

(10) Patent No.: US 12,380,814 B2
(45) Date of Patent: Aug. 5, 2025

(54) SUPPORT DEVICE FOR SUPPORTING AN ELECTRONIC DEVICE WITHIN AN ACCOMMODATING SPACE OF THE SUPPORT DEVICE

(71) Applicant: VusionGroup GmbH, Fernitz-Mellach (AT)

(72) Inventor: Andreas Rössl, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 0 days.

(21) Appl. No.: 18/553,583

(22) PCT Filed: Apr. 13, 2021

(86) PCT No.: PCT/EP2021/059597
§ 371 (c)(1),
(2) Date: Oct. 2, 2023

(87) PCT Pub. No.: WO2022/218513
PCT Pub. Date: Oct. 20, 2022

(65) Prior Publication Data
US 2024/0363033 A1 Oct. 31, 2024

(51) Int. Cl.
*G09F 3/20* (2006.01)
*A47F 5/00* (2006.01)

(52) U.S. Cl.
CPC ............ *G09F 3/208* (2013.01); *A47F 5/0068* (2013.01); *G09F 3/204* (2013.01)

(58) Field of Classification Search
CPC ........ G09F 3/208; G09F 3/204; A47F 5/0068; A47F 5/0838; A47F 5/0846; A47F 5/0853; A47F 7/0042
(Continued)

(56) References Cited

U.S. PATENT DOCUMENTS

| | | | | |
|---|---|---|---|---|
| 3,969,838 A * | 7/1976 | Moore | G09F 7/08 40/607.1 |
| 4,832,195 A * | 5/1989 | Dahl | G11B 23/0236 211/40 |

(Continued)

FOREIGN PATENT DOCUMENTS

| | | | |
|---|---|---|---|
| CN | 117223043 A * | 12/2023 | G09F 3/204 |
| EP | 0683487 A2 | 11/1995 | |

(Continued)

OTHER PUBLICATIONS

International search report from WO Publication WO 2022/218513 A1 the Parent of the present application.

*Primary Examiner* — Jennifer E. Novosad
(74) *Attorney, Agent, or Firm* — Studebaker Brackett PLLC

(57) ABSTRACT

A support device, in particular a shelf edge strip, for supporting a module, particularly an electronic device, wherein the support device comprises an alignment wall for aligning the module which is inserted into the support device and the alignment wall comprises a longitudinal extent and a transverse extent running normal thereto, wherein the support device is designed in such a manner that the module, which is inserted as intended into the support device, can be moved inside the support device in a manner corresponding to or along the transverse extent of the alignment wall between a removal position and a holding position, in which the module is aligned on the alignment wall, and that the shape or the cross section of the support device forms a removal opening at a distance from the alignment wall, through which removal opening the module can only be removed from the support device starting from the removal position.

24 Claims, 7 Drawing Sheets

(58) Field of Classification Search
USPC ........ 211/119.003, DIG. 1, 41.12, 40, 87.01, 211/94.01
See application file for complete search history.

(56) References Cited

U.S. PATENT DOCUMENTS

| | | | | | |
|---|---|---|---|---|---|
| 4,919,287 | A * | 4/1990 | Haskett | G09F 7/18 211/41.12 |
| 5,105,952 | A * | 4/1992 | Krattiger | A47F 7/144 211/94.01 |
| 5,148,925 | A * | 9/1992 | Althoff | A47F 5/0853 211/94.01 |
| 5,394,996 | A * | 3/1995 | Carpenter | G09F 7/10 211/94.01 |
| 5,419,066 | A * | 5/1995 | Harnois | G09F 3/204 40/649 |
| 5,485,926 | A * | 1/1996 | Kundert | G11B 33/0483 312/9.9 |
| 5,497,889 | A * | 3/1996 | Genovesi | G11B 23/40 |
| 5,553,412 | A * | 9/1996 | Briechle | G09F 3/204 40/463 |
| 5,622,270 | A * | 4/1997 | Bezos | G11B 33/0483 211/41.12 |
| 5,667,083 | A * | 9/1997 | Schnoor | G11B 33/0483 211/41.12 |
| 5,921,405 | A * | 7/1999 | Dumas | G11B 33/0483 211/DIG. 1 |
| 6,035,569 | A * | 3/2000 | Nagel | A47F 5/0068 40/658 |
| 6,069,596 | A * | 5/2000 | Marvin | G09F 3/204 345/52 |
| 6,119,990 | A * | 9/2000 | Kump | A47F 5/0869 211/86.01 |
| 6,126,125 | A * | 10/2000 | Dalton | G09F 3/204 248/205.2 |
| 6,142,322 | A * | 11/2000 | Smith | A47F 5/0869 211/183 |
| 6,209,730 | B1 * | 4/2001 | Ewing | G11B 33/0483 211/94.01 |
| 6,553,702 | B1 * | 4/2003 | Bacnik | G09F 3/204 40/649 |
| 6,568,112 | B2 * | 5/2003 | Lowry | G09F 3/204 40/649 |
| 6,935,062 | B2 * | 8/2005 | Lowry | G09F 3/204 248/223.41 |
| 7,028,851 | B1 * | 4/2006 | Fenger | A47F 7/144 211/41.12 |
| 7,287,350 | B2 * | 10/2007 | Fast | G09F 3/0295 211/183 |
| 7,308,770 | B2 * | 12/2007 | Fast | G09F 3/204 40/642.01 |
| 7,455,081 | B2 * | 11/2008 | Bacnik | G09F 3/204 40/642.02 |
| 7,726,057 | B2 * | 6/2010 | Brinkman | G09F 3/204 248/220.21 |
| 7,806,279 | B2 * | 10/2010 | Kubota | A47F 5/0846 211/94.01 |
| 8,770,416 | B1 * | 7/2014 | Guida | B43L 1/008 211/DIG. 1 |
| 9,657,890 | B2 * | 5/2017 | Botello | A47F 5/0846 |
| 9,948,072 | B2 * | 4/2018 | Lütze | H02B 1/202 |
| 10,706,749 | B1 * | 7/2020 | White | G09F 3/204 |
| 11,450,241 | B2 * | 9/2022 | Kim | G09F 3/204 |
| 2006/0240683 | A1 * | 10/2006 | Bre' | H02B 1/052 439/16 |
| 2007/0051816 | A1 | 3/2007 | Chu | |
| 2007/0090073 | A1 * | 4/2007 | Blum | A47F 5/0846 211/94.01 |
| 2022/0335862 | A1 * | 10/2022 | Rössl | G06K 7/0008 |

FOREIGN PATENT DOCUMENTS

| | | | | |
|---|---|---|---|---|
| FR | 3001875 | A1 | 8/2014 | |
| JP | 2008083664 | A | 4/2008 | |
| WO | WO-2017153481 | A1 * | 9/2017 | G06F 3/147 |
| WO | 2020249232 | A1 | 12/2020 | |
| WO | WO-2023051913 | A1 * | 4/2023 | G09F 3/204 |

* cited by examiner

SUPPORT DEVICE FOR SUPPORTING AN ELECTRONIC DEVICE WITHIN AN ACCOMMODATING SPACE OF THE SUPPORT DEVICE

CROSS-REFERENCE TO RELATED APPLICATIONS

This is a 35 U.S.C. 371 National Stage Patent Application of International Application No. PCT/EP2021/059597, filed Apr. 13, 2021 which is hereby incorporated by reference in its entirety.

TECHNICAL FIELD

The invention relates to a support device comprising an accommodating space for accommodating and for holding a module, which can be removed from the accommodating space again. The invention furthermore relates to a module, which is designed for insertion into the accommodating space of the support device and for removal from this accommodating space.

BACKGROUND

WO 2017/153481A1 discloses a module as an electronic display unit, which is also termed an "electronic shelf label" or ESL for short and which comprises as a constituent of its fastening element, which is structurally integrated into the ESL and is used for fastening the ESL on a support device which is designed as a shelf edge strip, a pin-like and magnetically retractable blocking element. The blocking element projects out of the housing of the ESL and is used for latching in a groove or recess or a hole of the correspondingly designed shelf edge strip. Using the blocking element, the ESL can be held at the provided holding position in the shelf edge strip, which defines an accommodating space by means of the shape thereof, so that the removal from the shelf edge strip, the theft of the ESL, as well as the displacement thereof along the shelf edge strip is reliably prevented. The blocking element can be retracted with the aid of a separate special tool, which is brought into direct contact with the ESL, with the aid of a magnetic field which can be generated by means of the special tool, so that the ESL can be removed from the shelf edge strip, directly from the holding position. This is only possible by means of people who have access to the special tool.

However, the necessity of this special tool has proven disadvantageous in multiple respects, because the special tool is fundamentally an additional part which is to be used during the work with the ESLs on the shelf edge strip. This special tool is often lost or misplaced, which leads to delays during the change or adjustment of the positioning of the ESLs. In addition, the replacement of this special tool is connected with considerable logistical problems, because in the case of equipment with a strong permanent magnet, special delivery or transport conditions are to be complied with.

Therefore, the object of the invention is to provide an improved support device, an improved module and a system consisting of one such support device and at least one such module supported by the support device.

SUMMARY OF THE INVENTION

This object is achieved by a support device according to claim 1. The subject of the invention is therefore a support device, in particular a shelf edge strip, for supporting a module, particularly an electronic device, wherein the support device comprises an alignment wall for aligning the module which is inserted into the support device and the alignment wall comprises a longitudinal extent and a transverse extent running normal thereto, wherein the support device is designed in such a manner that the module, which is inserted as intended into the support device, can be moved inside the support device in a manner corresponding to or along the transverse extent of the alignment wall between a removal position and a holding position, in which the module is aligned on the alignment wall, and that the shape or the cross section of the support device forms a removal opening at a distance from the alignment wall, through which removal opening the module can only be removed from the support device starting from the removal position.

Furthermore, this object is achieved by a module according to claim 15. The subject of the invention is therefore a module, preferably an electronic device, particularly preferably an electronic shelf display plate, which is designed for support by a support device, particularly a shelf edge strip, wherein the support device comprises an alignment wall for aligning the module which is inserted into the support device and the alignment wall comprises a longitudinal extent and a transverse extent running normal thereto, wherein the support device is designed in such a manner that the module, which is inserted as intended into the support device, can be moved inside the support device in a manner corresponding to or along the transverse extent of the alignment wall between a removal position and a holding position, in which the module is aligned on the alignment wall, and that the shape or the cross section of the support device forms a removal opening at a distance from the alignment wall, through which removal opening the module can only be removed from the support device starting from the removal position, wherein the module comprises a first dimension, which corresponds to the transverse extent of the alignment wall and which is larger than the width of the removal opening and is smaller than the transverse extent of the alignment wall.

Furthermore, this object is achieved by a system. The subject of the invention is therefore a system, which comprises a support device according to the invention and at least one module according to the invention.

The measures according to the invention are therefore associated with the advantage that a removal of the module from the support device can take place without additional special tool. In particular, during the removal, no force at all, which leads to the elastic deformation or temporary shape change of the support device, must be applied in order to forcibly expand the removal opening, in order then to be able to remove the module from the support device through the expanded removal opening. In the present invention, the user must merely know that the module cannot be removed directly from the holding position, but rather is initially to be brought into the removal position, before the user can remove the module from the support device. This facilitates the work with the modules considerably, particularly in a business premises of a retailer, where the support devices are realized as shelf edge strips and sometimes thousands of electronic shelf displays are positioned held as modules on shelf edge strips, wherein the equipment of the shelf edge strips with the modules and/or the positioning of the modules on the shelf edge strips is often to be changed in the shortest time.

The support device can in principle be realized in various ways. Thus, it may for example be a tabletop sign holder, which can be erected on a counter or possibly fixed there. Likewise, it is possible to design the support structure as a clothes tag, which can be fixed to clothes, such that the clothes tag hangs there. However, to keep the description of the invention compact, reference is made predominantly in the following to a shelf edge strip as preferred embodiment of the support device. Also, the orientation of the support device and therefore also the orientation of the module fastened to the support device may be arbitrary. The support device can for example be manufactured from a plastic or a composite material, such as e.g. glass-fibre-reinforced plastic. Also, a metal which is preferably non-magnetic or non-magnetizable, such as e.g. aluminium, can be used.

As a non-exhaustive list of examples for modules, electronic devices with sensor units or sensors, such as motion sensors, temperature sensors, light sensors and cameras, input devices such as rotary or push-buttons, touch sensors, touchscreens, output devices such as lights, loudspeakers, printers, e.g. thermal printers, or electronic display devices realized for example by means of liquid crystal display (LCD) screens, organic light-emitting diode (OLED) screens, etc. or e-paper displays or electrophoretic screens, are mentioned here. Also, a module may be realized as a non-electronic module, such as e.g. a pure placeholder or a conventional (non-electronic) shelf edge strip sign, which carries e.g. product and/or price information printed on a paper or plastic carrier, and the like.

If such a module is realized as an electronic device, the module can provide the function thereof autonomously at the holding position or be integrated into an electronic network.

A fully autonomous electronic device has an own energy supply, such as a solar panel for example, a replaceable battery or a rechargeable battery. The energy supply may however also be realized with the aid of other measures, such as e.g. by using power over WiFi technology, with the aid of which the energy supply can take place over a further distance by means of radio signals, or by using NFC technology (NFC stands for near field communication) or else RFID technology (RFID stands for radio frequency identification here), with the aid of which the energy supply can take place over relatively short distances directly at the support device.

Also, the communication supply of the electronic device, that is to say data and/or signal traffic to the device and away from the device may be implemented differently. Thus, for example, each device can comprise its own radio module, which enables communication according to an (at least de facto) standardized communication method (e.g. ZigBee, WiFi, WLAN, etc.) or else according to a proprietary communication method (e.g. disclosed in WO 2015/124197 A1). In this case, each electronic device usually communicates with an access point, to which the electronic device is assigned wirelessly by means of preceding registration. The usually multiple access points in each case supply a group of electronic devices and provide a connection bridge to a server or a cloud-based management instance, where a management software is executed, from where the actual activation or querying of the electrical devices is coordinated or takes place.

For the purpose of communication supply, possibly also for the purpose of supply with energy, one central supply device can however also be provided for each support device, which supply device supplies the electronic devices supported on the support device either in a contact-based manner, that is to say by means of electrical lines (e.g. integrated into the support device), or contactlessly, that is to say by means of capacitive or in particular inductive coupling (such as e.g. in the case of NFC or RFID). This supply device then forms the interface to one of the aforementioned access points. In the case of the wired coupling to the supply device, each electronic device can comprise corresponding contacts, using which the device can contact the lines, which are preferably integrated into the support device. In the case of the contactless coupling to the supply device, each electronic device can comprise corresponding coupling means, such as e.g. a capacitance plate or inductor or coil with associated matching network and electronic circuit.

Finally, it may be mentioned that the supply devices can also be connected to a communications network in a wired manner. The same applies for the energy supply, wherein a central power supply unit can be provided here for energy supply e.g. for a group of supply devices.

A holding position is to be understood to mean a position in which the module remains without further assistance, after the module has been placed in or on the support device.

A removal position is to be understood to mean a position from which the module can be taken from the support device or can be removed from the support device.

Inside the accommodating space, the module in the holding position is positioned at least slightly locally offset compared to the removal position.

The module and the support device are designed or matched to one another such that the module can be moved between the removal position and the holding position. The module can therefore be displaceable or tiltable or pivotable for example. The movability can be limited to a single movement type, that is to say for example only displaceability, or else comprise or permit a process of a plurality of movements, such as e.g. tilting or inclining or else pivoting and displacement. This results in at least one unique displacement movement, using which the module can be moved out of the holding position into the removal position (if appropriate also back again). The movement of the module between the holding position and the removal position takes place in this case substantially still inside the support device, that is to say inside an accommodating space, which is delimited or defined by the shape of the support device, in which accommodating space the module is accommodated.

These measures according to the invention allow inducted people, such as for example sales personnel or service technicians who are instructed about the existence of the two positions and have knowledge of the module only being removable from the support device via the removal position, a fast and uncomplicated removal (for example for replacement, carrying to a different position or else the maintenance of the modules), whilst an unintentional or unauthorized removal of the module from the support device by other, that is to say non-inducted people is excluded or substantially prevented, because these people do not usually have the necessary specialized knowledge.

Further particularly advantageous embodiments and developments of the invention result from the dependent claims and also the following description.

The support device and the module can be designed or the designs thereof can be matched to one another in such a manner that the movability of the module from the holding position to the removal position (and possibly also vice versa) is to take place via a plurality of different movement processes or movement sequences, in order to carry out the shifting of the module from the one to the other position. Thus, the support device and the module can be designed in such a manner or the designs thereof can be matched to one another in such a manner that e.g. an initial tilting movement and a subsequent displacement or e.g. an initial displacement and a subsequent tilting of the module is necessary in order to move the module from the holding position into the removal position.

Preferably however, the support device and the module are designed in such a manner or the designs thereof are matched to one another in such a manner that the module can only be moved from the holding position into the removal position by means of a substantially unique movement process or a unique movement sequence.

It may be noted that the movements mentioned by way of example, tilting and displacement, may also occur in an overlapping manner, so that the module can or must for example be tilted and displaced simultaneously, in order to reach the removal position. It is also possible that these movements must respectively take place in a defined value range of the relevant parameter, such as for example a tilting of the module between 25° and 30° and/or for example a displacement of the module by 3 and 7 mm in a certain direction. The (at least partial) overlap of different movement processes or sequences may also be caused structurally by the dimensions or shaping of the support device or the module.

Structural matching of the designs to one another may in any case advantageously be realized such that the support device is designed in such a manner that the width of the removal opening is smaller than the dimension (e.g. height) of the module which corresponds thereto.

Therefore, by means of a targeted matching of the dimensions of the support device and the module to one another, it is ensured that the module can be displaced or shifted inside the support device, that is to say in the accommodating space between the two positions, namely the holding position and the removal position. In this case, the dimension of the removal opening, that is to say the width of the removal opening, which is somewhat smaller than the dimension of the module which corresponds thereto, which in the following is termed the height of the module, prevents it from being possible to remove the module from the support device directly through the removal opening, starting from the holding position, by means of a movement away from the alignment wall, that is to say substantially normal to the alignment wall, towards the removal opening. As the width of the removal opening is dimensioned somewhat too small compared to the height of the module, the module is blocked at the edges of the removal opening, that is to say is held inside the accommodating space, in the event of such a movement starting from the holding position or in the event of an attempt to execute such a movement.

The same of course also applies if the circumstances are considered in reverse, that is to say if the height of the module is chosen to be somewhat larger than the width of the removal opening.

With regards to the removal opening, it may be established that the same can be formed e.g. by the bars or strips which delimit the removal opening, which run at a distance from one another and at a respective distance from the alignment wall substantially parallel to the alignment wall, actually parallel to the longitudinal extent.

However, it has proven advantageous if the support device itself delimits the removal opening in a manner defined by the shape of the support device. Therefore, it is particularly advantageous that the support device comprises at least two delimiting walls, namely a first delimiting wall and a second delimiting wall, and the delimiting walls enclose the alignment wall on both sides along the longitudinal extent of the alignment wall and run substantially transversely to the alignment wall, in particular form a C profile together with the alignment wall, wherein the removal opening is delimited by free ends of the delimiting walls.

In this context, it may be mentioned that the meaning of "transverse" is to be understood such that the delimiting walls do not absolutely have to be orientated at an angle of 90° to the alignment wall, but rather also at an angle which deviates therefrom, that is to say may run diagonally towards one another or else run towards one another in a curved manner.

It has proven particularly advantageous if the free ends of the delimiting walls are orientated towards one another. These free ends form the edges of the support device in the form of lips and thus delimit the removal opening in a lip-like manner, wherein starting from the removal opening in the direction of the alignment wall, the accommodating space opens, which has a larger width, that is to say the width of the removal opening between the lips.

According to a further aspect of the invention, the first delimiting wall comprises, adjacent to the alignment wall, a module accommodating groove, which runs parallel to the longitudinal extent of the alignment wall and is designed for partially accommodating the module in the removal position. This module accommodating groove enables the shifting of the module away from the holding position and towards the removal position.

In the holding position, the module covers the width of the removal opening completely, as viewed from the accommodating space. If the module comprises e.g. a screen, then this screen is visible in a manner essentially unimpeded by the edges of the removal opening. The screen is therefore enclosed by the edges of the removal opening at opposite screen edges. However, if the module is sunk in the module accommodating groove, the screen edge which is localized adjacent to the module accommodating groove is shifted inwards into the accommodating space, positioned behind the edge of the support device, which delimits the removal opening, and covered by this edge of the support device.

The module accommodating groove is preferably separated, as viewed from the groove base thereof, by a step from one of the edges of the support device, which delimits the removal opening. This step means that the module or the edge of the module, which is closest to the step, has to be shifted by the step width towards to the alignment wall, before the module can penetrate into the module accommodating trough. That is to say, as an introduction to the movement from the holding position to the removal position, an initial movement of the module or a part of the module towards the alignment wall must take place, so that the module is no longer hindered by the step in terms of the further movability of the module.

Particularly preferably, the module accommodating groove is designed in such a manner that the first side of a module (e.g. the lower side wall thereof) can be dipped so deeply into the module accommodating groove, that the opposite side (e.g. the upper side wall) of the module can be pivoted out of the removal opening. The module accommodating groove therefore comprises a depth which allows one side wall of the module, as in the preceding example the lower side wall, to dip so deeply, that the other side wall, in the present example the upper side wall, can dip through below the edge of the support device, which delimits the removal opening there, adjacent to the upper side wall.

Only when the module has been shifted in a manner corresponding to the transverse extent, such as e.g. substantially parallel to the alignment wall, from the holding position towards the removal position, can the module be removed from the removal opening. As explained, this movement or this shift leads to one of the edges of the module, which would otherwise be captured inside the support device at the edge thereof, which forms the delimitation of the removal opening, then being brought into the clearance space of the removal opening and it being possible to pivot or tilt the module, with this edge at the front, out of the accommodating space or accommodating region, and it being possible to remove the same from the accommodating space completely, through the removal opening. The distance of the removal position in relation to the holding position is therefore to be chosen such that the module is moved far enough in relation to the edges of the removal opening, so that the module can readily be moved out of the removal opening in the removal position.

In this context, it may also be determined that the movement sequence explained for removal is the sequence which is used in reverse order for inserting the module into the support device. Therefore, the removal position is the same as the insertion position, which the module assumes or into which the module is brought, when the module is inserted into the support device.

The preceding explanations about the geometry of the support device do not however necessarily mean that the module always has to bear against the alignment wall in the holding position and possibly also in the removal position. The actual circumstances may result from the shaping and/or the dimensions of the interior of the support device, which forms the accommodating space of the support device and which is used for accommodating the module and which is delimited by the shape of the support device, and/or the shaping and/or the dimensions of the module, particularly the thickness thereof. These parameters may e.g. also be dimensioned such that the module can also move inside the accommodating space in the transverse direction normal to the alignment wall.

The width of the removal opening can be matched to the height of the front wall of the module or even vice versa. This is advantageous if the module forms a shelf edge strip display and the front wall is formed substantially by a screen and this screen should be visible in the holding position in a manner unhindered by the support device. Unaffected by this, such a module may comprise further structural measures, such as e.g. one or more lips at the (upper and/or lower) side wall, which mean that the module cannot be removed from the holding position of the module directly through the removal opening, as explained.

Finally, with reference to the width of the removal opening, it may in general be stated, that the same is chosen such, with consideration of the dimension of the front wall of the module which is used in the support device and the previously explained functionality or movement processes, that the front wall can be seen well and unhindered.

According to a further aspect of the invention, which may also be considered an independent subject of the invention, the support device may comprise at least one automatic positioning means, with the aid of which a module, which is inserted into the support device as intended, can automatically be positioned in the holding position. This automatic positioning means may for example be realized with the aid of one or more springs, which act e.g. from one side, such as e.g. supported on the support device itself, particularly supported on the base of the module accommodating groove, on one side of the inserted module and push or press the module into the holding position. Analogously to that, a leaf spring or the like may also be positioned at the locations mentioned and achieve this effect.

The same may in principle also apply to the module. Therefore, according to a further aspect of the invention, the module may comprise at least one second automatic positioning means, with the aid of which, a module, which is inserted into the support device as intended, can automatically be positioned in the holding position. This second automatic positioning means can also be designed analogously to that of the support device. However, this automatic positioning means is localized in the module. The second automatic positioning means is preferably localized in an edge region (e.g. in the region of the lower side wall) of the module, which is furthest removed from the edge region (e.g. the region of the upper side wall) which is closest to the holding position.

In a system made up of support device and module, the first automatic positioning means can be provided without the second automatic positioning means and vice versa. However, both automatic positioning means may also be provided together.

According to a further aspect of the invention, which may also be seen as an independent subject of the invention, the first automatic positioning means is formed by at least one first magnetic-force positioning means, with the aid of which a module, which is inserted into the support device as intended, can automatically be positioned in the holding position with the aid of a magnetic force acting between the module and the support device.

In the case of a solution based on attractive magnetic interaction, it is necessary that the module is also appropriately equipped. Therefore, it has proven particularly advantageous that the second automatic positioning means is formed by at least one second magnetic-force positioning means. This magnetic-force positioning means is preferably localized in an edge region of the module, particularly preferably in the region of the rear wall or adjacent to the rear wall of the module, wherein the rear wall is intended for aligning the module on the alignment wall.

Thus, it is achieved, that a module which is in the insertion position (or even in the removal position), which was positioned there using the hand of a person and is released there, is pulled automatically, that is to say without assistance of the person previously handling the module, solely by the attractive magnetic force, into the holding position, moves there and once arrived there, of course is also quickly fixed there in a strongly magnetic manner, because during the approach to the holding position, the distance between the magnetically attractively interacting means was reduced, until in the holding position, a minimum distance is present. When the holding position is reached, the maximum magnetic holding force is consequently present. The positioning of the magnetic-force positioning means in the region of the rear wall of the module additionally ensures that the rear wall of the module is automatically aligned on the alignment wall.

In contrast to the previously explained solutions, which are based on spring force, as caused e.g. by coil springs, the solution based on magnetism has the advantage, that the maximum attractive force is present at the holding position, because the minimum distance between the magnetically attractively interacting elements is present there, whereas in the spring-based solution, the respective spring has the smallest spring force at the holding position, because the spring is already most relaxed there.

In principle, the first magnetic-force positioning means could be realized by one or more permanent magnets, which are used such e.g. that the permanent magnets are positioned in an equidistantly distributed manner along the longitudinal extent of the support device.

However, in the case of the support device, it is preferably provided that the first magnetic-force positioning means is realized by a magnetizable material.

In order to determine the holding position in the support device, it has proven particularly advantageous if the magnetizable material is localized in a locally delimited manner, preferably in the form of a material strip, particularly preferably in the form of a ferromagnetic metal rail. The position of the material strip or the metal rail substantially defines the holding position along the transverse extent, to which the set of magnets arranged in the module is pulled.

Advantageously, the locally delimited magnetizable material, particularly the ferromagnetic metal strip, is localized at an edge region of the alignment wall, preferably along the longitudinal extent of the alignment wall, particularly preferably along the entire longitudinal extent of the alignment wall. On the one hand, this ensures that there is no limitation with regards to the positionability of the module along the longitudinal extent. On the other hand, the module inserted into the support device is automatically conveyed as far as possible onto the edge region of the accommodating space and not only positioned, but also orientated or aligned there, possibly under interaction with the delimiting wall which runs adjacent thereto, in a manner in which the module is reliably leaned against two inner wall regions of the support device.

The automatic positioning or alignment of the module can however also be achieved in the accommodating space without the touching interaction of the module with the delimiting wall, specifically solely by means of a magnetic-force-based alignment of the module, which results due to suitable positioning of at least two magnets in the module. The two magnets align the module such that each of the magnets assumes a minimum distance from the first magnetic-force positioning means of the support device. For this purpose, the material strip or the metal rail is preferably also positioned with sufficient distance from the delimiting wall along the alignment wall.

In order to obtain an automatic positioning or also alignment which is as optimal as possible, it has proven particularly advantageous that the first magnetic-force positioning means is integrated substantially flush into an inner surface of the support device and is particularly integrated into the alignment wall. This prevents jamming or catching of the module during the magnetic-force-generated automatic positioning or alignment of the module.

Particularly in the case of a wire- or strip- or rail-like embodiment of the magnetizable material, it has proven advantageous that the alignment wall comprises an accommodating shaft, in which the first magnetic-force positioning means is inserted. This allows a simple installation and also a reliable and reproducible determination of the position of the magnetizable material.

On the part of the module, it has proven advantageous that the second magnetic-force positioning means is realized by at least one permanent magnet. This permanent magnet can be positioned in the rear wall or adjacent thereto, inside the housing of the module.

Preferably, the at least one second magnetic-force positioning means is formed by two permanent magnets, which are localized at a distance from one another along a rear wall of the module. This measure increases the magnetic attractive force, which benefits the automatic positioning and also improves the automatic alignment of the module inside the support device, which has already been noted.

According to a further aspect of the invention, the module comprises a rear wall, which comprises at least two rear wall orientations, which differ from one another. Preferably, the rear wall comprises a first rear wall section, which runs substantially parallel to a front wall of the module, and a second rear wall section, which is orientated in an inclined manner starting from the first rear wall section towards the front wall, and wherein the two rear wall sections meet along a separating line (which runs in a straight line in particular), which runs parallel to the longitudinal extent of the alignment wall if a module is supported as intended by the support device. This design is associated with the advantage that in the case of a module, which is held in the holding position, in which module, e.g. due to magnetic force, the first rear wall section is held flat on the alignment wall, a tilting movement about the separating line is introduced by manual pressure on the second rear wall section, so that the first rear wall section is lifted off the alignment wall. As a result, the holding force of the magnetic interaction is reduced due to build-up of distance from the alignment wall and the module can be displaced from the holding position into the removal position more easily.

The relationship of the dimensions of the respective rear wall sections, as measured in the direction corresponding or parallel to the transverse extent of the alignment wall can be selected such that the second rear wall section is shorter than the first rear wall section. Therefore, the structure of the rear wall sections can be used as a type of transformation ratio, in order to overcome the magnetic force, wherein a movement at the one end of the module is transformed into a larger movement at the opposite end of the module and there a correspondingly larger distance is obtained between the first and second magnetic-force positioning means.

The tilting movement is enabled by means of a corresponding configuration (e.g. dimensioning and shaping) of the accommodating space adjacent to the one (e.g. upper) end and the other (e.g. lower) end of the module. Actually, the spacing between the lip of the support device, which is adjacent to the module accommodating groove or delimits the module accommodating groove, and the alignment wall of the support device is somewhat larger than the thickness of the module at this end of the module. At this end of the module, the depth of the module accommodating groove allows a tilting away from the said lip, towards the alignment wall, which tilting is contactless with respect to the base of the module accommodating groove.

At the other end of the module, which is localized adjacent to the other lip of the support device, the inner wall of the accommodating region is designed such that, during the tilting movement, the region of the module there can readily move away from the alignment wall towards this lip, that is to say to the greatest extent possible cannot rub or jam or catch on the inner wall.

In the case of a design of the support device with a step between the module accommodating groove and the removal opening, this tilting movement also causes the part of the module (in the example explained the lower side wall or the rib or strip located there) which was previously located above the step to move over the edge of the step, as a result of which a movement of the module from the holding position to the removal position is first enabled.

According to a further aspect of the invention, the support device is designed in such a manner that the module which is inserted as intended into the support device can be removed in a direction normal to the alignment wall at least to some extent, in particular completely, from the alignment wall and positioned in an intermediate position. This intermediate position is characterized in that the magnetic attractive force is reduced in such a manner due to the enlarged distance from the alignment wall compared to the holding position, that the module can be displaced along the support device in the longitudinal direction of the support device, without being taken out of the removal opening. In this case, the module can slide along on the lips of the support device.

Also, no removal out of the removal opening is possible in this position, because the intermediate position differs from the removal position and in the intermediate position, the module is blocked with regards to a movement in the normal direction to the alignment wall by the edges or borders of the support device, which enclose the removal opening.

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures:

FIG. 9-FIG. 11 show a further exemplary embodiment of a module according to the invention, designed as a display unit, and a support device according to the invention, designed as a shelf edge strip, in a schematic manner, wherein the display unit is located in various positions in the shelf edge strip;

DESCRIPTION OF THE EXEMPLARY EMBODIMENTS

Figure 1B:
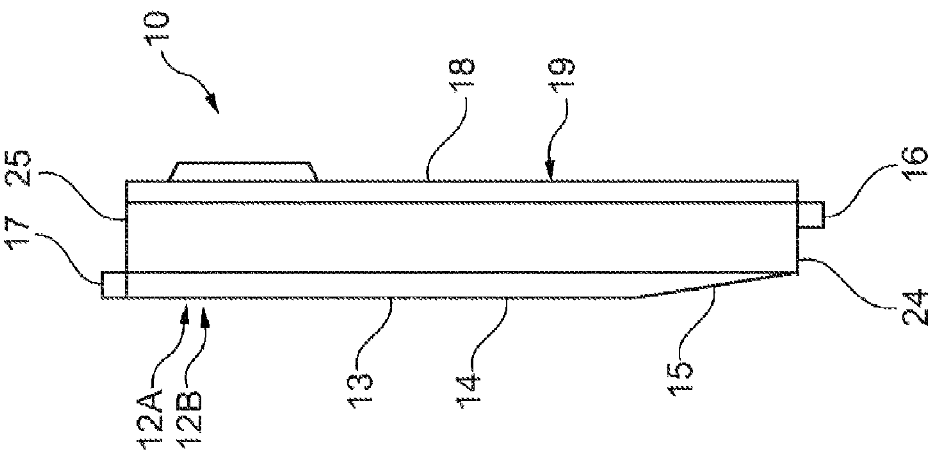
FIG. 1B shows a module according to the invention, designed as a display unit, in a schematic manner.
Figure 1A:
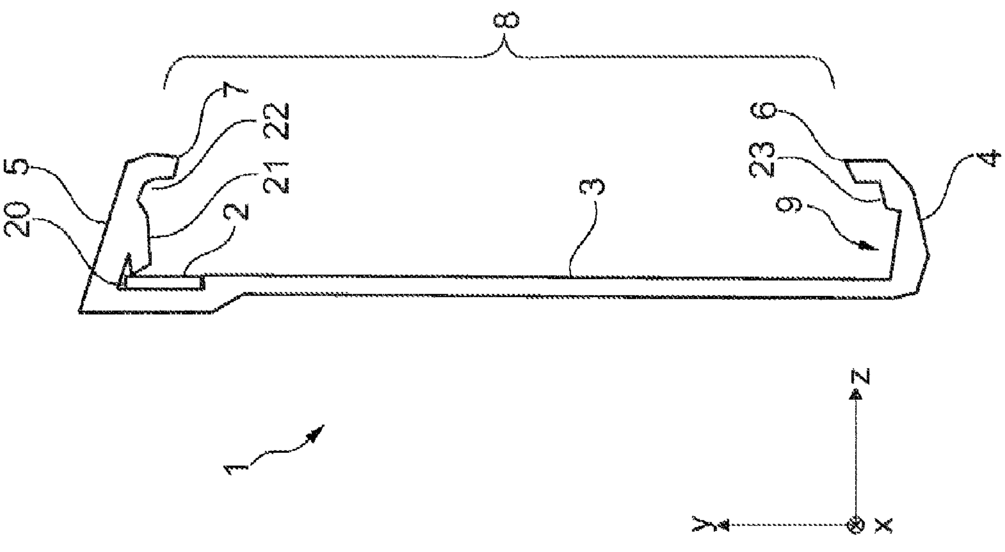
FIG. 1A shows a support device according to the invention, designed as a shelf edge strip, in a schematic manner.

FIG. 1A illustrates a support device, which is designed as a shelf edge strip 1 and which is designed for supporting a display unit 10, which is illustrated in FIG. 1B. The shelf edge strip 1 comprises an alignment wall 3. Furthermore, the shelf edge strip 1 comprises a first delimiting wall 4 and a second delimiting wall 5. The shelf edge strip 1 is manufactured from a non-magnetic, dimensionally stable material, such as plastic or aluminium and constructed in one piece, so that the first and second delimiting walls 4, 5 respectively merge into the alignment wall 3.

At the end of the delimiting walls 4, 5, the cross section of the shelf edge strip 1 in each case comprises a first catch 6 and a second catch 7, which extend substantially along the entire shelf edge strip 1 as a continuous lip. The first catch 6 forms the end of the first delimiting wall 4 and the second catch 7 forms the end of the second delimiting wall 5. The shape of the shelf edge strip 1 corresponds to a C profile in terms of the cross section thereof or when viewed from the side, as is illustrated in FIG. 1A. Between the first catch 6 and the second catch 7, a removal opening 8 is created along the shelf edge strip, through which removal opening a display unit 10 can be inserted into the shelf edge strip 1 or the inserted display unit 10 can be removed. The inner walls of the shelf edge strip 1 therefore delimit an accommodating space which is open in the direction of the removal opening 8. The accommodating space is used for accommodating the display unit 10.

Whether the shelf edge strip 1 is open or closed at the left or right edge or end thereof is a question of the respective design or installation and does not relate to the invention explained here. In the case of the use of the shelf edge strip 1 in e.g. a business premises, the display unit 10 is in any case usually inserted through the removal opening 8 or removed from there. If the shelf edge strip 1 is configured to be open at the side, the display unit 10 can of course also be pushed into the shelf edge strip 1 there or pushed out of the shelf edge strip there, which is without importance for the explanation of the invention of this patent application, however, and is only mentioned here for the sake of completeness.

The first delimiting wall 4 is designed such that the first delimiting wall comprises a module accommodating groove 9, which also extends substantially along the entire longitudinal extent. The module accommodating groove 9 delimits or defines a pivot region for the display unit 10 and is dimensioned such that a part of the display unit 10 can be accommodated and pivoted in the module accommodating groove.

The first delimiting wall 4 furthermore comprises a step 23, which raises from the base of the module accommodating groove 9 to the first catch 6 and forms an intermediate level between the base of the module accommodating groove 9 and the outer edge of the first catch 6.

In FIG. 1A, a metal rail 2 is furthermore illustrated, which forms a first magnetic-force positioning means for magnetic-force-based automatic positioning. The metal rail 2 is positioned in the region of the shelf edge strip 1, in which the alignment wall 3 merges into the second delimiting wall 5. The alignment wall 3 comprises an accommodating shaft 20, which extends substantially along the entire longitudinal extent, for accommodating the metal rail 2, in which accommodating shaft the metal rail 2 is inserted or clamped. Furthermore, the second delimiting wall 5 comprises a bevelled positioning strip 21, which extends substantially along the entire longitudinal extent and which holds the metal rail 2 in position in the accommodating shaft 20.

Furthermore, the second delimiting wall 5 comprises a yielding groove 22, which extends substantially along the entire longitudinal extent and into which an edge region of the display unit 10 can yield.

The rear side of the shelf edge strip 1 is not discussed further in the present case. At this point, it may only be mentioned that the rear side can be designed to be connected to a different part of the shelving unit, e.g. to a part of the shelf.

The module which fits the shelf edge strip 1 is illustrated in FIG. 1B as a display unit 10. The display unit 10 comprises a front wall 18, which comprises a screen 19 which is integrated into the front wall 18 and therefore forms a constituent of this front. The screen 19 is designed as an e-paper screen.

The display unit 10 comprises electronics 26 arranged in the interior thereof (see also FIGS. 7A and 7B), which electronics control or supply the screen 19 and provide further functions, such as e.g. wireless communication with an access point, which is not discussed further in this patent application however.

The display unit 10 comprises a rear wall 13. The rear wall 13 consists of a first rear wall section 14 and a second rear wall section 15, wherein the first rear wall section 14 runs substantially parallel to the front wall 18. The second rear wall section 15 is inclined towards the front wall 18 in comparison to the first rear wall section 14, in the illustrated exemplary embodiment by approx. 9° towards the front wall 18. As a result, the display unit 10 is tiltable about the region, in which the first rear wall section 14 merges into the second rear wall section 15. The separating line between these rear wall sections 14 and 15 is designed as a straight line and constitutes a tilting edge. The display unit 10 can tilt about this tilting edge when the rear wall 13 of the display unit rests on a plane (e.g. the alignment wall 3).

Furthermore, the display unit 10 comprises two magnets 12A and 12B (see also FIGS. 7A and 7B), which form a second magnetic-force positioning means for magnetic-force-based automatic positioning of the display unit 10 in the shelf edge strip 1. The magnets 12A, 12B are located in the interior of the display unit 10 on the rear wall 13 along an edge of the display unit 10 close to the housing corners, that is to say with the largest possible distance from one another. However, the magnets can also be positioned in other positions, but spaced from one another.

As can be seen in FIG. 1B, the display unit 10 comprises a first side wall 24 and a second side wall 25, which connect the rear wall 13 and the front wall 18 to one another at diametrically arranged positions (opposite ends of the display unit 10). The first side wall 24 comprises a first strip 16, which is localized close to the front wall 18. On the opposite side wall 25, a second strip 17 is formed, which terminates substantially flat with the rear wall 13 or connects to the same. The distance between the first strip 16 and the second strip 17 is larger here than the distance between the first catch 6 and the second catch 7.

Figure 6:
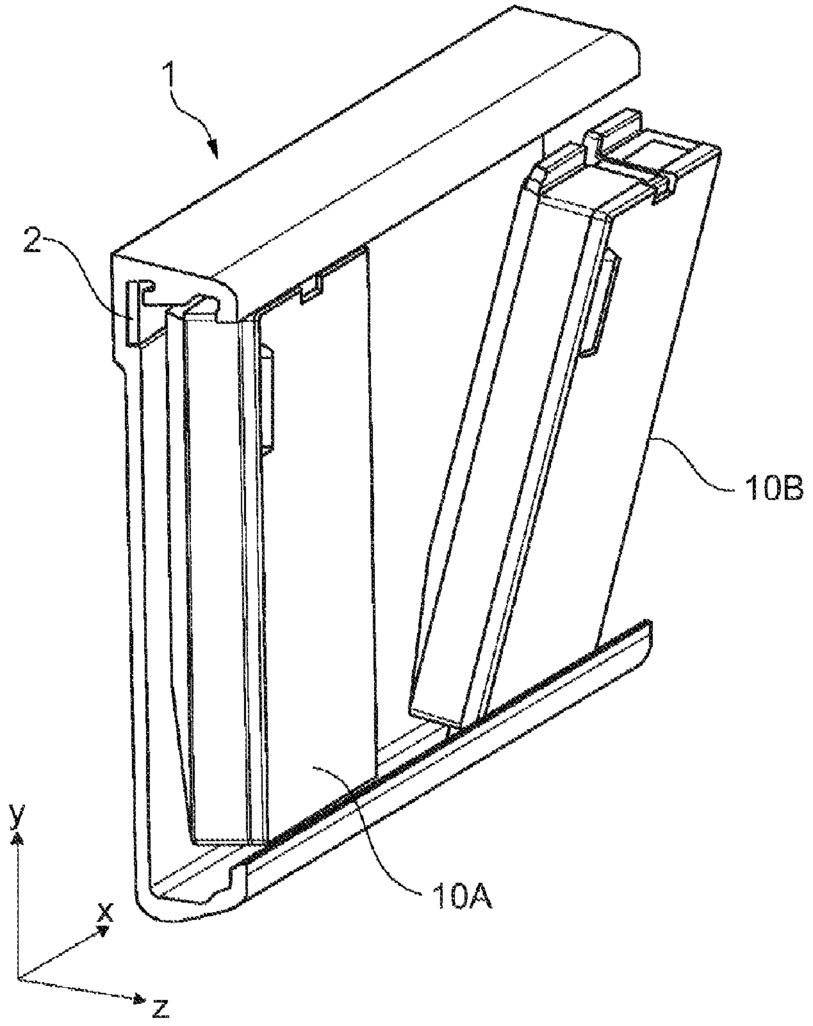
FIG. 6 shows a perspective view of two display units in various positions on the shelf edge strip, in a schematic manner.

Furthermore, to clarify the directional details, a coordinate system is illustrated, the orientation of which can be seen in a perspective in FIG. 6 in particular. Here, this is a right-handed (orthogonal) coordinate system, wherein the x direction runs parallel to the longitudinal extent of the alignment wall 3, that is to say also parallel to the longitudinal extent of the shelf edge strip 1 in the drawing plane, the y direction runs parallel to the transverse extent of the alignment wall 3 in the drawing plane, and wherein the z direction runs normal to the alignment wall 3 in the drawing plane. The y direction points from the region of the alignment wall 3, which is adjoined by the first delimiting wall 4, towards the region of the alignment wall 3, which is adjoined by the second delimiting wall 5. The z direction points from the alignment wall 3 in the direction of the removal opening 8.

Figure 2:
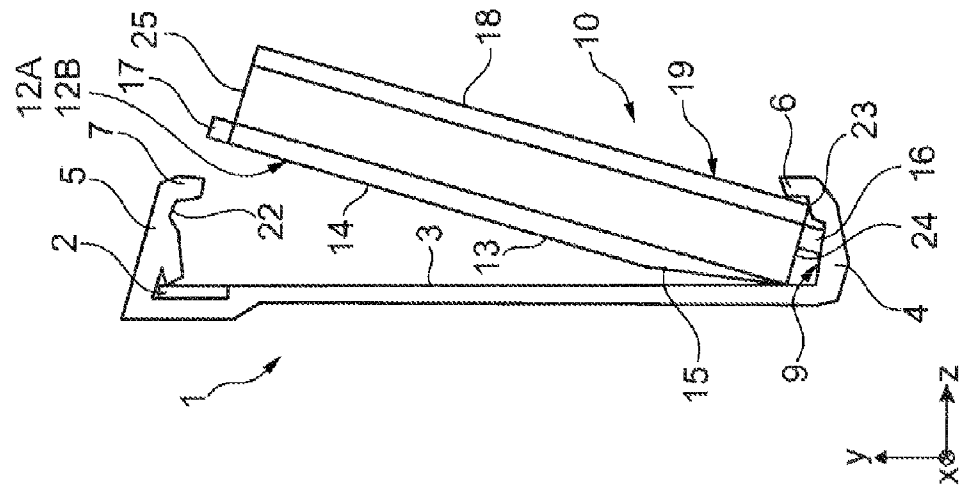
FIG. 2-FIG. 5 show the display unit in various positions in the shelf edge strip, in a schematic manner.

The insertion of the display unit 10 into the shelf edge strip 1 and the removal of the display unit 10 from the shelf edge strip 1 is discussed in the following. For this purpose, various positions for the display unit 10 are illustrated in FIGS. 2 to 4 during the insertion process or the insertion movement and in reverse order during the removal process or the removal movement. A few reference numbers were omitted in the visualization for the sake of clarity.

As illustrated in FIG. 2, one begins the insertion of the display unit 10 in that one inserts the display unit 10, held by the hand of a person (not illustrated), with the lower end of the display unit 10 at the front, that is to say with the first strip 16 at the front, into the module accommodating groove 9, wherein the upper end (that is to say the second strip 17) is at the same time held forwards out of the shelf edge strip 1. The display unit 10 is therefore orientated, with respect to the alignment wall 3, so as to be inclined away from the same. The first strip 16 is placed at the base of the module accommodating groove 9, that is to say below the step 23. In this position and orientation, the display unit 10 can subsequently be inserted or introduced into the accommodating space.

Figure 3A:
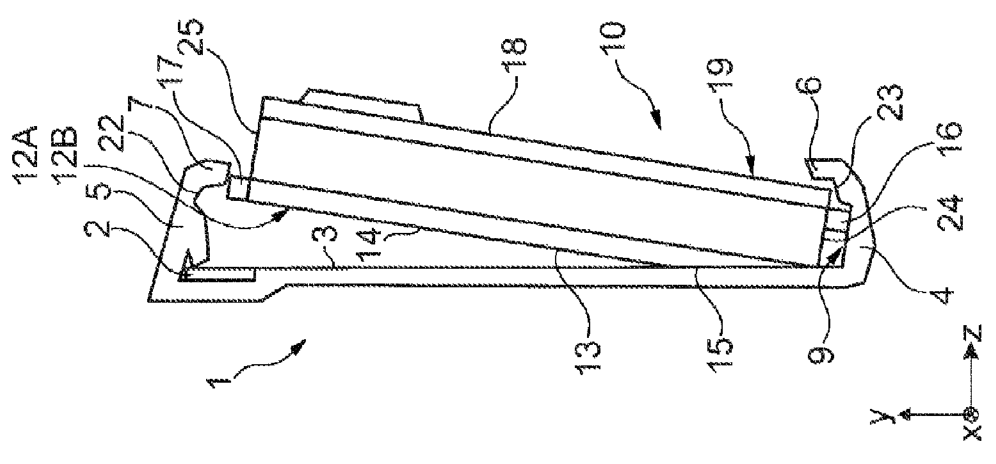
Figure 4:
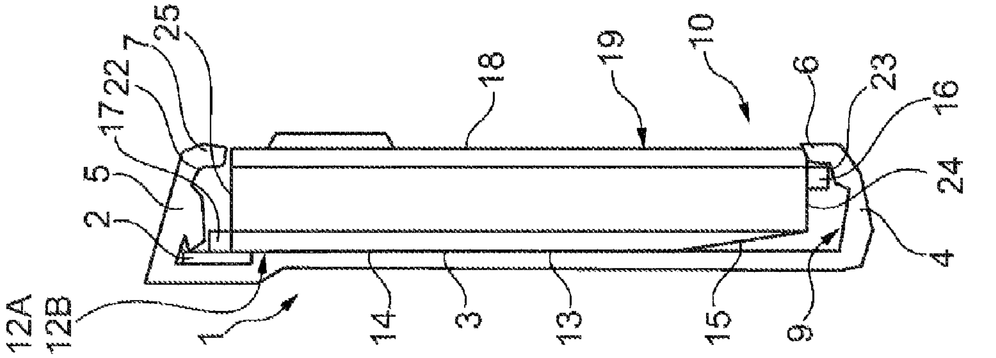

As illustrated in FIG. 3A, in the module accommodating groove 9, the pivot region there is used in order to move the second strip 17 past the second catch 7 into the accommodating space, that is to say through the removal opening 8, until the second rear wall section 15 is aligned or comes to lie on the alignment wall 3. In this position, the second rear wall section 15 is aligned parallel to the alignment wall 3 and rests against the alignment wall 3. In this position, the display unit is located in the insertion position, wherein the insertion position is de facto identical to a removal position.

Upon arrival in the insertion position, the user can release the display unit 10 and the display unit 10 is, with the aid of the attractive magnetic force which acts between the two magnets 12A and 12B and the metal rail 2, automatically pulled further into the accommodating space of the shelf edge strip 1 and aligned and fixed there in a holding position, which is illustrated in FIG. 4. This final movement process takes place automatically, as mentioned, without the manual assistance of the user. In this movement process, the first rear wall section 14 is tilted against the alignment wall 3 whilst at the same time, the second rear wall section 15 is lifted away from the alignment wall 3. Essentially simultaneously thereto, a movement takes place parallel to the alignment wall 3 towards the second delimiting wall 5 until the final holding position is reached. During this movement process, the distance between the magnets 12A and 12B on the one hand and the metal rail 2 on the other hand is reduced continuously and the attractive magnetic effect increases in the process, until the magnetic effect reaches a maximum in the holding position, in which the minimum distance between the magnets 12A, 12B and the metal rail 2 is present.

The movement towards the second delimiting wall 5 is in the present case delimited by the inner course of the wall of the second delimiting wall 5 and the interaction thereof with adjacent regions of the display unit 10.

In this holding position, the first rear wall section 14 is aligned parallel to the alignment wall 3 and rests against the alignment wall.

Figure 5:
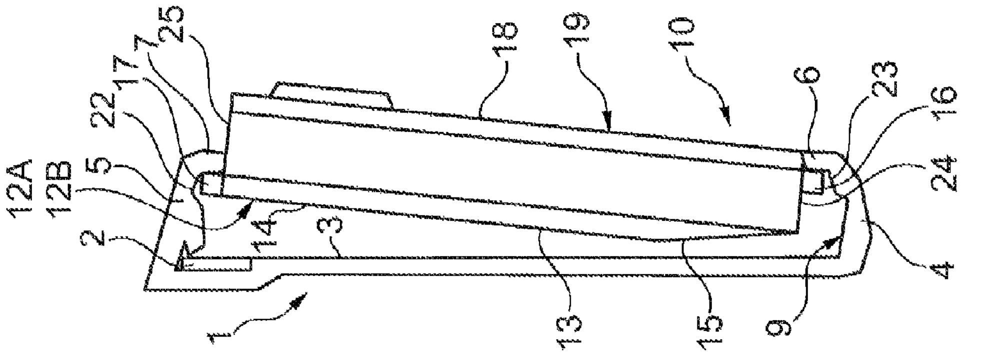

If a person unacquainted with the system then attempts to remove the display unit 10 from the shelf edge strip 1 and for this reason instinctively moves the display unit away from the alignment wall 3 in the z direction, the first strip 16 is blocked at the first catch 6. As a result, the display unit 10 tilts about the contact point of the first strip 16 with the first catch 6, so that the second strip 17 is moved towards the second catch 7 and is blocked there by the second catch 7. In this position, the shape of the adjacent inner region of the catch 7 prevents a movement in the positive y direction. In addition, in this position, the step 23 prevents a movement of the display unit 10 in the negative y direction. The display unit 10 is therefore located in a blocked position, which is illustrated in FIG. 5. The display unit 10 is captive in this blocked position and cannot itself be removed from the shelf edge strip 1 through the removal opening 8 by further pulling on the display unit and also cannot be displaced upwards or downwards. Only a movement back into the accommodating space is possible, which leads directly to an increase of the magnetic attractive force, however, which in turn leads to a positioning in the holding position, because the increase of the magnetic attractive force takes place very fast, so that this can barely to not at all be compensated by the person holding the display unit 10 with their hand when releasing the display unit 10.

As can be seen in FIG. 5, the dimensions of the shelf edge strip 1, particularly of the removal opening 8 and the display unit 10, are matched to one another such that a removal from the blocked position through the removal opening without damage is excluded. If the display unit 10 is released again in the blocked position, the display unit moves—as explained previously-independently, that is to say automatically, under the attractive magnetic force action, back into the holding position (see FIG. 4).

Figure 3B:
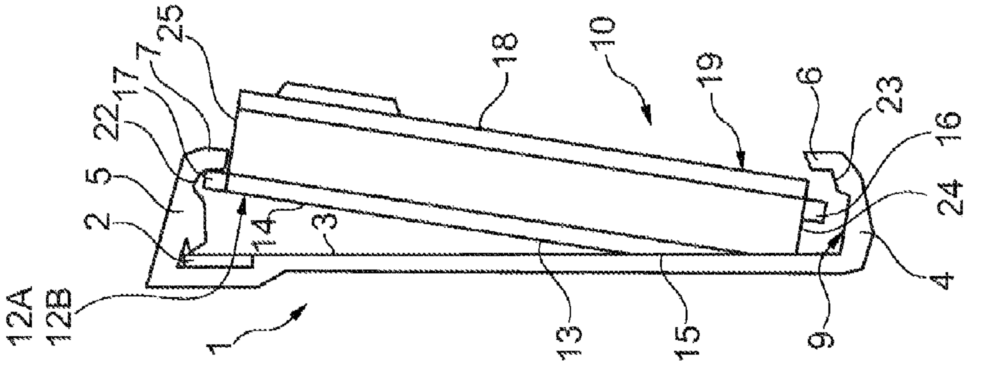

In order to take the display unit 10 out of the shelf edge strip 1 non-destructively, the movement process explained in connection with the insertion must be run through essentially in the reverse order. For this, one can, starting from the holding position illustrated in FIG. 4, by gently pressing on the front wall 18 of the display unit 10 in the region, in which the rear wall 13 is formed from the second rear wall section 15, tilt the display unit 10, so that the second rear wall section 15 is pressed onto the alignment wall 3. During this movement, the magnets 12A, 12B are moved away from the metal strip 2 and therefore the magnetic attractive force acting therebetween is reduced. As no movement in the negative y direction has taken place yet, the display unit 10 tilts with the second strip 17 against the second catch 7. The display unit is then located in an intermediate position, which is illustrated in FIG. 3B. In the intermediate position, the second rear wall section 15 of the display unit 10, as also in the removal position, rests against the alignment wall 3. The first strip 6 is pivoted away from the step 23. Subsequently, one can displace the tilted display unit 10, starting from the intermediate position, in the negative y direction along the alignment wall 3, until the first strip 16 stands at the first delimiting wall 4, actually sits at the base of the module accommodating groove 9, and the display unit 10 is located in the removal position illustrated in FIG. 3A. In this position, the second strip 17 can be moved past below the second catch 7.

Then, starting from the removal position, the display unit 10 can be tilted into the position illustrated in FIG. 2, that is to say can be tilted out through the removal opening 8 using the upper end of the display unit, and subsequently be removed completely from the shelf edge strip 1.

In FIG. 6, a first display unit 10A is located in the holding position in the shelf edge strip 1, whilst a second display unit 10B, which is located therebehind, is located in a position which is pivoted out or tilted through the removal opening 8. This is illustrated in a perspective.

Figure 7B:
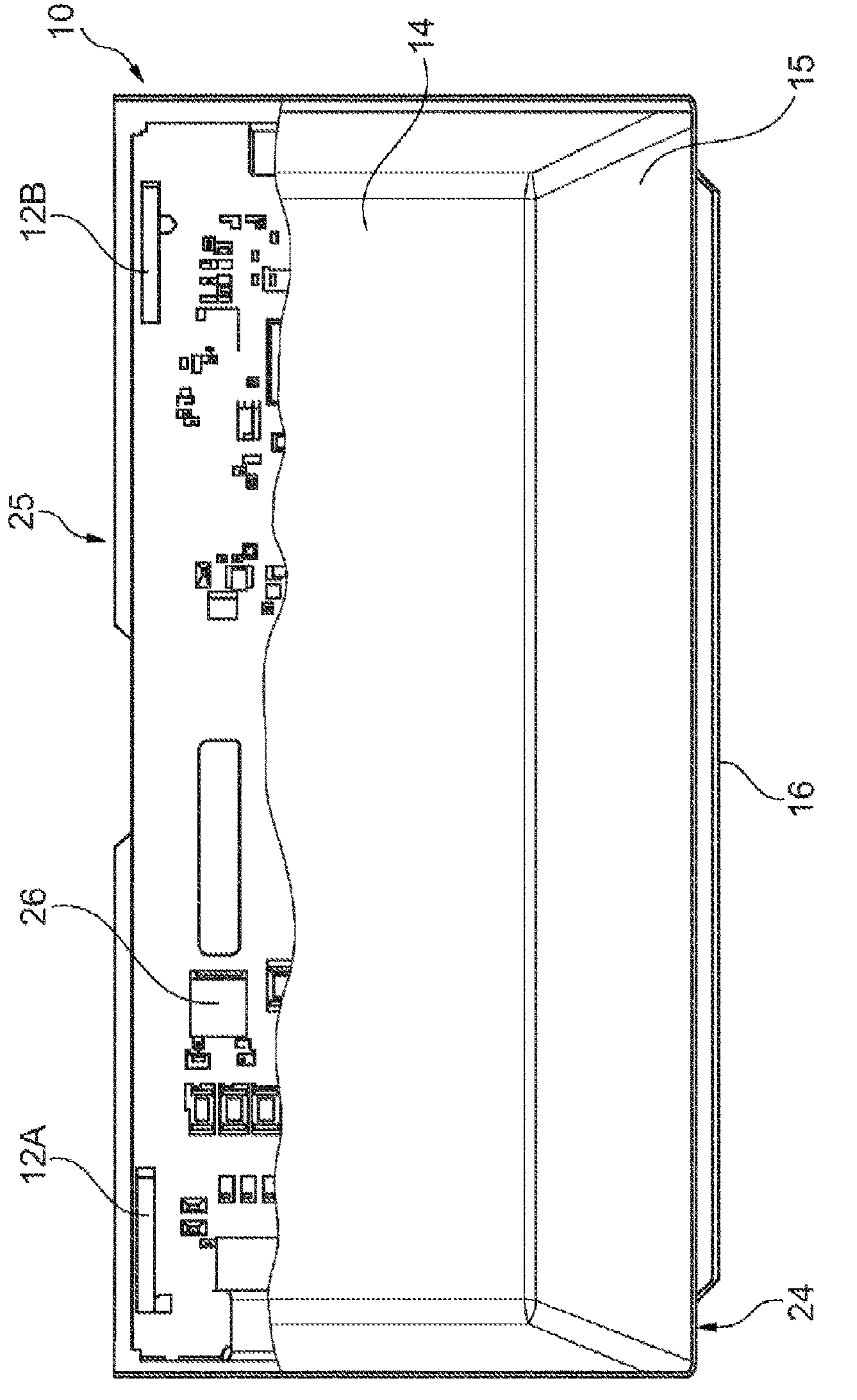
FIG. 7B shows a further sectioned illustration of the display unit, in a schematic manner.
Figure 7A:
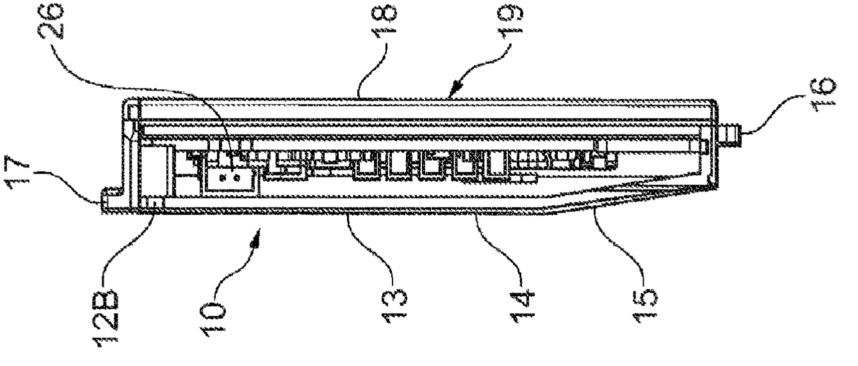
FIG. 7A shows a sectioned illustration of the display unit, in a schematic manner.

In FIG. 7A, the display unit 10 is depicted in a side view, wherein the wall of the display unit 10 is illustrated sectioned such that a view onto the electronics 26 and one of the two magnets 12B is possible. It can clearly be seen here that the magnets 12A and 12B are inserted or held in holders, e.g. pressed or adhesively bonded there.

In FIG. 7B, the display unit 10 is depicted with a view onto the rear wall 13, wherein a part of the first rear wall section 14 is illustrated sectioned, in order to expose a view onto part of the electronics 26 and onto the two magnets 12A and 12B. It can clearly be seen here that the magnets 12A or 12B are arranged at the upper edge almost in the corners of the display unit 10. This positioning benefits the automatic magnetic-force-based alignment of the display unit 10 in the shelf edge strip 1 in the holding position. This leads to an optimum alignment of the display unit 10 as parallel as possible to the longitudinal extent of the shelf edge strip 1, so that even display units 10 which are arranged next to one another or generally modules can be placed in the shelf edge strip 1 in a perfectly aligned manner without offset with respect to one another and without differing from one another in terms of orientation. As a consequence, a perfect and uncluttered appearance is obtained, which is of great value not only to operators of a business premises, such as e.g. a supermarket, but also to the customers visiting there.

Figure 8B:
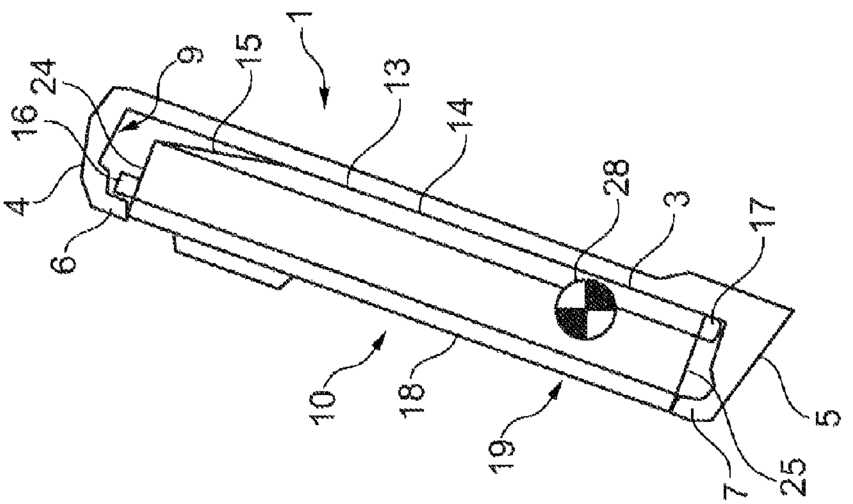
FIG. 8B shows a further illustration of the display unit and the shelf edge strip, in a schematic manner.
Figure 8A:
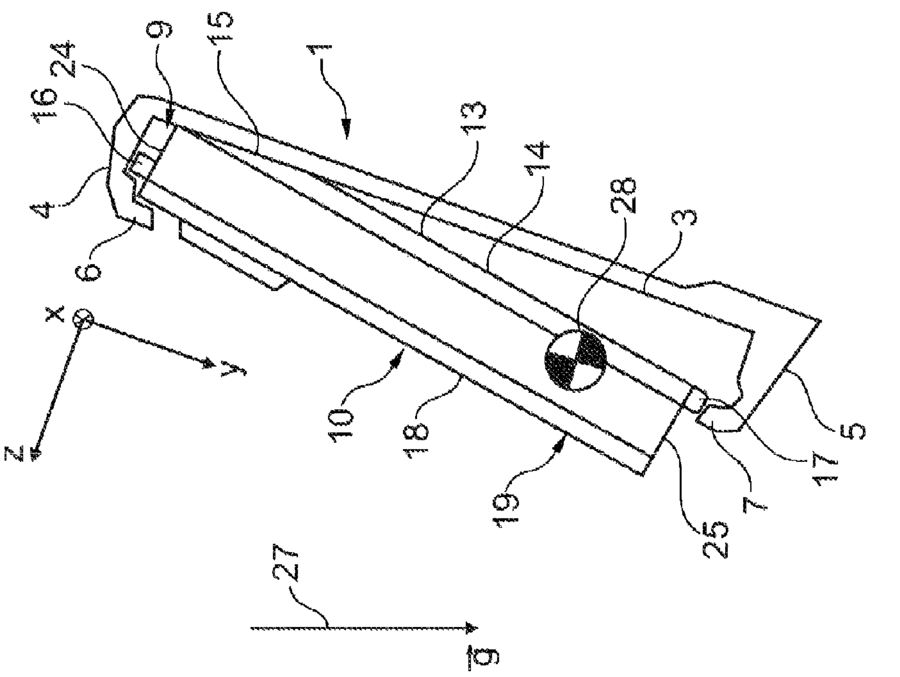
FIG. 8A shows a further exemplary embodiment of a module according to the invention, designed as a display unit, and a support device according to the invention, designed as a shelf edge strip, in a schematic manner.

A further exemplary embodiment of a display unit 10 and also an associated shelf edge strip 1 are illustrated in FIGS. 8A and 8B, wherein the display unit 10 and the shelf edge strip 1 dispense with magnetic-force positioning means, but furthermore, the mutually matched geometry of the display unit and the shelf edge strip in the present orientation of the system made up of support device 1 and display unit 10 forms a mutually matched system of automatic positioning means. The orientation of the shelf edge strip 1 is chosen such here, that the display unit 10, when it is released, itself falls from the insertion position, just as from the removal position, which positions are indeed identical, only under the action of earth's gravity, that is to say automatically, into the accommodating space and is there conveyed to the holding position.

In this exemplary embodiment, the shelf edge strip 1 and in particular the alignment wall 3 is aligned in a somewhat inclined manner with respect to acceleration due to gravity, the direction of which is indicated by an arrow 27. The shelf edge strip 1 can take on this inclination e.g. on the front edge of a shelf. In the present display unit 10, the centre of gravity 28 is advantageously localized closer to the second strip 17 than to the first strip 16.

The insertion process and the removal process take place substantially equivalently to the previously mentioned exemplary embodiment. Here also, the display unit 10 can be placed into the module accommodating groove 9 manually by a user, using the first strip 16. Subsequently, the user can pivot the display unit 10 so far in the module accommodating groove 9 until the second rear wall section 15 rests on the alignment wall 3. The display unit 10 and the shelf edge strip 1 are matched to one another such that the display unit 10, when it is released in this position, moves independently, that is to say automatically, into the holding position. Here also, the holding position is the position in which the first rear wall section 14 rests on the alignment wall 3 or is aligned by the alignment wall 3, as can be seen in FIG. 8B. This movement is discontinued automatically under the action of gravity, preferably due to the position of the centre of gravity 28.

For removal, it is then possible to press gently on the front wall 18 in the region in which the rear wall is formed from the second rear wall section 15, in order to tilt the display unit 10. Then, the display unit 10 can be shifted along the alignment wall 3, essentially counter to acceleration due to gravity, until the display unit 10 reaches the removal position, from where the display unit 10 can be removed from the shelf edge strip 1.

If however, the display unit 10 is simply only pulled on, starting from the holding position, that is to say the display unit is only pulled away from the alignment wall 3 in the direction of the removal opening 8, the display unit is caught as illustrated in FIG. 5 and, explained in the context of the figure, on the two catches 6 or 7 and cannot be guided through the removal opening 8.

Figures 9, 10A, 10B, 11:
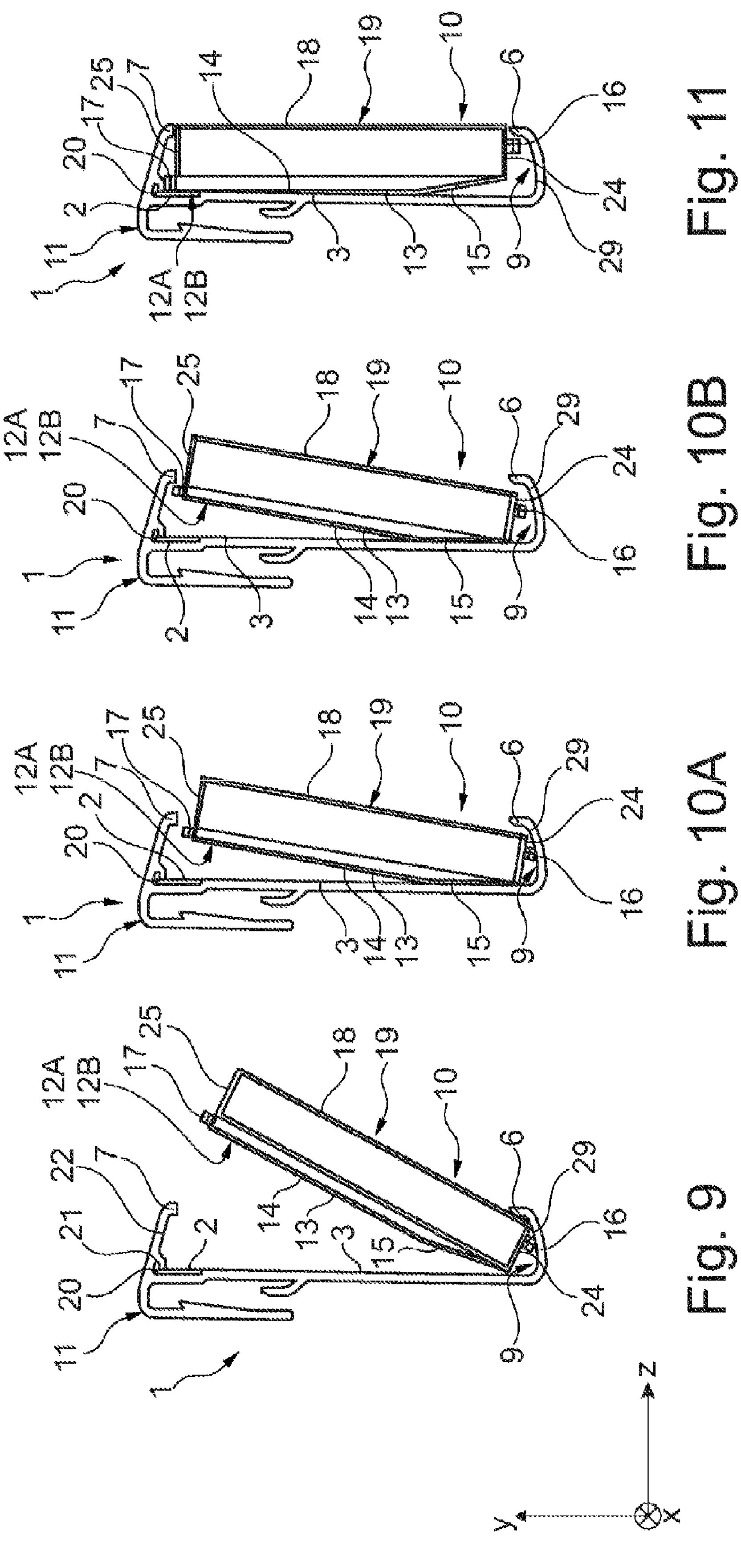

FIGS. 9 to 11 schematically show a further exemplary embodiment of the display unit 10 and the shelf edge strip 1, wherein the insertion and removal process is substantially equivalent to the insertion and removal process of the exemplary embodiment illustrated in FIGS. 1A to 5. In contrast to the exemplary embodiment explained initially, the step 23 is dispensed with in the shelf edge strip 1 here (in the exemplary embodiment of FIGS. 9 to 11). The module accommodating groove 9 is correspondingly enlarged and the inner wall of the shelf edge strip 1 is shaped to be curved in the region of the module accommodating groove 9, so that the first strip 16 of the display unit 10 can slide in the module accommodating groove 9.

Furthermore, the shelf edge strip 1 shown here comprises a mounting structure for mounting the shelf edge strip 1 on a shelving unit.

The display unit 10 is illustrated in FIG. 9 in a position equivalent to FIG. 2.

The display unit 10 is illustrated in FIG. 10A in a position equivalent to FIG. 3A.

The display unit 10 is illustrated in FIG. 10B in a position equivalent to FIG. 3B.

The display unit 10 is illustrated in FIG. 11 in a position equivalent to FIG. 4.

In the blocked position (which is also equivalent here to the blocked position illustrated in FIG. 5), the first strip 16 and the region of the first side wall 24 which is located at the front wall 18 are in contact with the first catch 6. This contact prevents a movement of the display unit 10 out of the blocked position in the negative y direction. The task of the step 23, namely to limit the movability of the display unit 10 (particularly in the y direction), can also be taken on by other mutually matched components of the display unit 10 and the shelf edge strip 1, as shown in this exemplary embodiment.

The shelf edge strip 1 and the display unit 10 can thus be matched to one another such that the tolerance during the insertion or removal movement lies in a desired range. Thus, in the variant shown, with step 23, the removal movement must be carried out more precisely, as a result of which it is made more difficult for people unacquainted with the system to remove the display unit 10 from the shelf edge strip 1, because the people must know the exact movements with slight deviations or tolerances, in order to remove the display unit 10. In the variant without a step 23, the knowledge about the movement process is likewise necessary for removing the display unit 10. However, as larger tolerances were chosen here, that is to say in parts deviations from the ideal movement are possible within a desired range, people acquainted with the system, that is to say for example employees of a shop, who want to remove the display unit 10 for maintenance and later reinsert the display unit, can insert the display unit 10 into the shelf edge strip 1 or remove the display unit from the same with fluid and fast movements.

Figure 12:
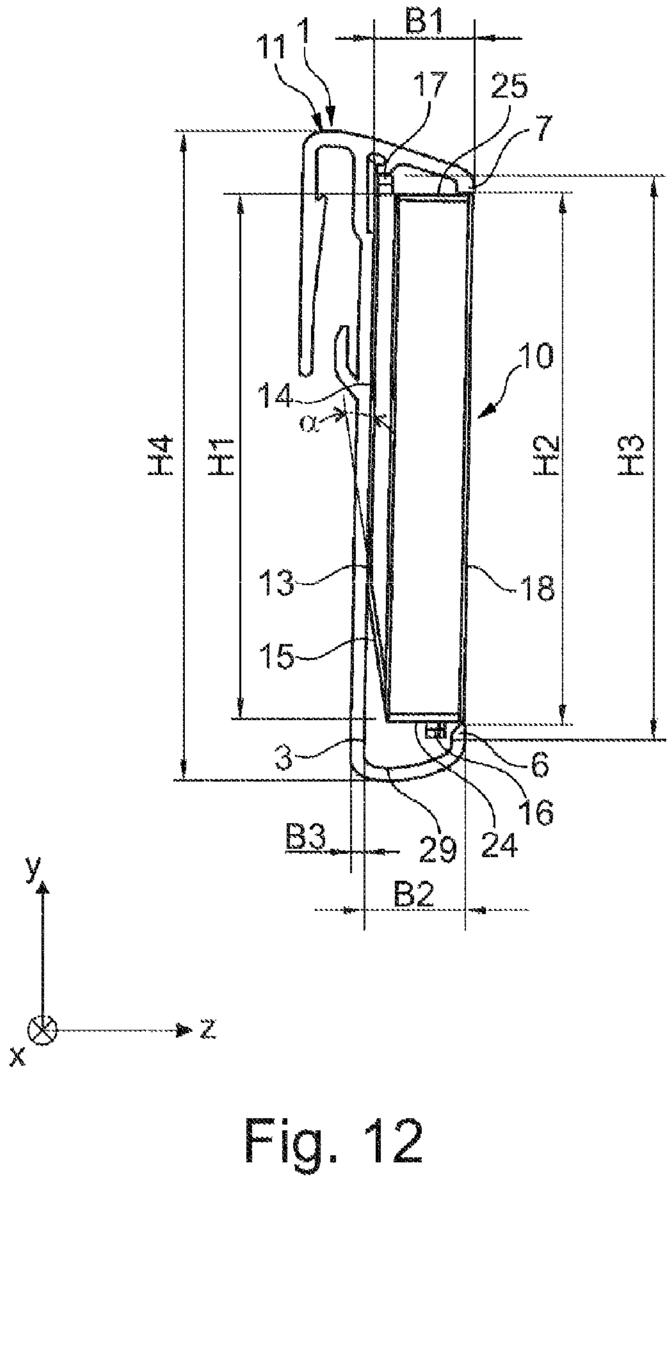
FIG. 12 shows a further illustration of the shelf edge strip and the display unit with exemplary dimensions or exemplary proportions, in a schematic manner.

Exemplary dimensions or proportions for the display unit 10 and the shelf edge strip 1 are illustrated in the holding position in FIG. 12. Here, the display unit 10 comprises a first height H1, which (in the holding position) runs along the y direction from the first side wall 24 up to the second side wall 25. The first height H1 also substantially corresponds here to the dimension of the front wall 18 along the y direction. The first height H1 corresponds to 43 mm in this example.

The shelf edge strip 1 comprises a second height H2 in the y direction between first catch 6 and second catch 7, that is to say along the removal opening 8. The second height H2 is slightly larger than the first height H1, so that the display unit 10 can be positioned in the holding position with the front wall 18 between the two catches 6 and 7. The second height H2 is 43.5 mm here.

The display unit 10 comprises a third height H3 in the y direction (observed in the holding position) between the outermost regions of the first strip 16 and the second strip 17. The third height H3 is larger than the second height H2, so that pulling the display unit 10 out of the shelf edge strip 1 is prevented in the blocked position (in the z direction). The third height H3 is 46 mm here.

The shelf edge strip 1 comprises a fourth height H4 in the y direction, which represents the total height of the shelf edge strip 1, including mounting structure, that is to say reflects the spacing of the outermost regions in the y direction. The fourth height H4 is approx. 53 mm here.

The second rear wall section 15 is inclined by an angle $\alpha$ with respect to the first rear wall section 14, so that tilting between the positions is enabled, as described. The angle $\alpha$ is approx. 9°.

The display unit 10 comprises a first width B1 in the z direction (in the holding position), which extends between the first rear wall section 14 and the front wall 18. The first width B1 corresponds to 8.3 mm here.

The shelf edge strip 1 comprises a second width B2 along the z direction between the alignment wall 3 and the outermost point of the first catch 6. The second width B2 is chosen to be slightly larger here than the first width B1, so that in the holding position, the display unit 10 is enclosed by the shelf edge strip 1 and the first catch 6 and the second catch 7 protrude slightly over the front wall 18 and protect the same, for example against impact loading.

The shelf edge strip 1 comprises a third width B3, which essentially represents the material thickness of the shelf edge strip. Regions which have special shapes for fulfilling further tasks for example, such as e.g. the mounting structure or the positioning strip 21, possibly comprise a different material thickness than the third width B3. The third width B3 is 1.2 mm here.

These dimensions present by way of example, how the support device or the shelf edge strip 1 and the module or the display unit 10 can be matched to one another. The dimensions shown here have been established in experiments as particularly advantageous for display units in this order of magnitude. A person skilled in the art may however correspondingly adapt or differently choose the dimensions and proportions, in order for example to match proportioned modules and support devices to one another differently or create a variation of the movement processes for insertion and removal.

Finally, it is once more pointed out that the figures previously described in detail are only concerned with exemplary embodiments, which can be modified in many different ways by a person skilled in the art, without departing from the scope of the invention. For the sake of completeness, it is also pointed out that the use of the indefinite article "a" or "an" does not mean that the relevant features cannot also be present multiple times.

The invention claimed is:

1. A support device configured to support a module, the support device comprising:

an alignment wall for aligning the module which is adapted to be inserted into the support device and the alignment wall comprises a longitudinal extent and a transverse extent running normal thereto;

a first delimiting wall extending from the alignment wall, the first delimiting wall comprising a first catch extending in a transverse direction and a first inner surface including a first inclined portion inclined to the first catch relative to the alignment wall; and a second delimiting wall extending from the alignment wall and opposite to the first delimiting wall along the transverse extent of the alignment wall, the second delimiting wall comprising a second catch extending in the transverse direction and a second inner surface including a second inclined portion inclined to the second catch relative to the alignment wall, wherein the support device is configured such that:

the module, when inserted into the support device, is adapted to be moved inside the support device in the transverse direction between a removal position and a holding position, in which the module is adapted to be aligned on the alignment wall, and the shape or the cross section of the support device forms a removal opening at a distance from the alignment wall, such that the removal opening is the only opening through which the module is adapted to be removed from the support device starting from the removal position, and wherein the support device is a shelf edge strip.

2. The support device according to claim 1, wherein a width of the removal opening is smaller than a width extending from the first inner surface to the second inner surface.

3. The support device according to claim 1, wherein the first delimiting wall and the second delimiting wall enclose the alignment wall on both sides along the longitudinal extent of the alignment wall and run substantially transversely to the alignment wall, and form a C profile together with the alignment wall, wherein the removal opening is delimited by free ends of the first catch and the second catch.

4. The support device according to claim 3, wherein the free ends of the delimiting walls are orientated towards one another.

5. The support device according to claim 3, wherein the first delimiting wall comprises, adjacent to the alignment wall, a module accommodating groove, which runs parallel to the longitudinal extent of the alignment wall and is designed for partially accommodating the module in the removal position.

6. The support device according to claim 5, wherein the module accommodating groove is configured such that when a first side of the module is positioned in the module accommodating groove, a second side of the module opposite to the first side of the module is adapted to be pivoted out of the removal opening.

7. The support device according to claim 1, wherein the support device comprises at least one automatic positioning means configured to automatically position the module in the holding position.

8. The support device according to claim 7, wherein a first automatic positioning means of the at least one automatic positioning means comprises a first magnetic-force positioning means configured to automatically position the module in the holding position by way of a magnetic force acting between the module and the support device.

9. The support device according to claim 8, wherein the first magnetic-force positioning means is integrated substantially flush into the alignment wall.

10. The support device according to claim 8, wherein the alignment wall comprises an accommodating shaft, in which the first magnetic-force positioning means is inserted.

11. The support device according to claim 8, wherein the first magnetic-force positioning means comprises a magnetizable material.

12. The support device according to claim 11, wherein the magnetizable material is a ferromagnetic metal rail.

13. The support device according to claim 11, wherein the magnetizable material is a material strip.

14. The support device according to claim 13, wherein the magnetizable material is positioned on an edge region of the alignment wall.

15. The support device according to claim 13, wherein the magnetizable material is positioned on an edge region of the alignment wall along the longitudinal extent of the alignment wall.

16. The support device according to claim 15, wherein the magnetizable material is positioned along the entire longitudinal extent of the alignment wall.

17. The support device according to claim 1, wherein the support device is configured such that the module, when inserted into the support device, is adapated to be removed at least partially in a direction normal to the alignment wall from the alignment wall and positioned in an intermediate position.

18. The support device according to claim 17, wherein the support device is configured such that the module, when inserted into the support device, is adapted to be completely removed in a direction normal to the alignment wall from the alignment wall.

19. A system, comprising:

a module configured to be supported by a support device; and the support device, wherein the support device comprises:

an alignment wall aligning the module which is configured to be inserted into the support device and the alignment wall comprises a longitudinal extent and a transverse extent running normal thereto;

a first delimiting wall extending from the alignment wall, the first delimiting wall comprising a first catch extending in a transverse direction and a first inner surface including a first inclined portion inclined to the first catch relative to the alignment wall; and a second delimiting wall extending from the alignment wall and opposite to the first delimiting wall along the transverse extent of the alignment wall, the second delimiting wall comprising a second catch extending in the transverse direction and a second inner surface including a second inclined portion inclined to the second catch relative to the alignment wall, wherein the support device is configured such that:

the module, when inserted into the support device, is adapted to be moved inside the support device in the transverse direction between a removal position and a holding position, in which the module is aligned on the alignment wall, and the shape or the cross section of the support device forms a removal opening at a distance from the alignment wall, such that the removal opening is the only opening through which the module is adapted to be removed from the support device starting from the removal position, wherein the module comprises a first dimension, which corresponds to the transverse extent of the alignment wall and which is larger than the width of the removal opening and is smaller than the transverse extent of the alignment wall, and wherein the module is an electronic device and the support device is a shelf edge strip.

20. The system according to claim 19, wherein the module comprises at least one automatic positioning means configured to automatically position the module in the holding position.

21. The system according to claim 20, wherein the automatic positioning means comprises at least one magnetic-force positioning means configured to automatically position the module in the holding position by way of a magnetic force acting between the module and the support device.

22. The system according to claim 21, wherein the at least one magnetic-force positioning means comprises two permanent magnets, which are localized at a distance from one another along a rear wall of the module.

23. The system according to claim 19, wherein the module comprises a rear wall, which comprises at least two rear wall orientations, which differ from one another.

24. The system according to claim 23, wherein the rear wall comprises a first rear wall section, which runs substantially parallel to a front wall of the module, and a second rear wall section, which is inclined starting from the first rear wall section towards the front wall, and wherein the two rear wall sections meet along a line, which runs parallel to the longitudinal extent of the alignment wall when the module is supported by the support device.

* * * * *